US010316952B2

(12) United States Patent
Matsumoto et al.

(10) Patent No.: US 10,316,952 B2
(45) Date of Patent: Jun. 11, 2019

(54) PLUG FOR VEHICLE (71) Applicant: TOYOTA JIDOSHA KABUSHIKI KAISHA, Toyota-shi, Aichi-ken (JP)

(72) Inventors: Takuya Matsumoto, Okazaki (JP); Tetsuya Kono, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 32 days.

(21) Appl. No.: 15/632,651

(22) Filed: Jun. 26, 2017

(65) Prior Publication Data
US 2018/0087646 A1 Mar. 29, 2018

(30) Foreign Application Priority Data

Sep. 27, 2016 (JP) ................................ 2016-188867

(51) Int. Cl.
| F16K 24/04 | (2006.01) |
| F16H 57/027 | (2012.01) |
| F16H 57/031 | (2012.01) |
| F16H 57/035 | (2012.01) |
| F16L 41/08 | (2006.01) |
| F16L 41/12 | (2006.01) |
| F16L 37/00 | (2006.01) |

(52) U.S. Cl.
CPC ......... *F16H 57/027* (2013.01); *F16H 57/031* (2013.01); *F16H 57/035* (2013.01); *F16K 24/04* (2013.01); *F16L 37/008* (2013.01); *F16L 41/086* (2013.01); *F16L 41/12* (2013.01)

(58) Field of Classification Search
CPC .... F16H 57/027; F16H 57/031; F16H 57/035; F16L 37/008; F16L 41/086; F16L 41/12; F16K 24/04
See application file for complete search history.

(56) References Cited

U.S. PATENT DOCUMENTS

| 3,231,300 A * | 1/1966 | Moroney | E05B 77/00 |
| | | | 174/153 G |
| 6,179,340 B1 * | 1/2001 | Adolf | F16L 25/0036 |
| | | | 285/140.1 |
| 6,908,117 B1 * | 6/2005 | Pickett, Jr. | F16L 41/086 |
| | | | 285/137.11 |
| 2007/0295158 A1 * | 12/2007 | Adleman | B60B 7/002 |
| | | | 74/606 R |

FOREIGN PATENT DOCUMENTS

| JP | S56-031955 U | 3/1981 |
| JP | H08-218818 A | 8/1996 |
| JP | H08-270890 A | 10/1996 |
| JP | 2008-180313 A | 8/2008 |
| JP | 2011-193954 A | 10/2011 |

* cited by examiner

*Primary Examiner* — Ian G Paquette
(74) *Attorney, Agent, or Firm* — Oliff PLC (57) ABSTRACT

A plug for a vehicle includes: a body portion; a plurality of insertion portions configured to be inserted into a through-hole provided in a housing; and a flange portion having a notch formed on an outer periphery so as to restrict a rotation of the body portion around an axial center. The insertion portions are formed at two positions opposed to each other across a straight line passing through the notch and the axial center and are provided with retaining lugs engageable with the through-hole.

4 Claims, 6 Drawing Sheets

PLUG FOR VEHICLE

INCORPORATION BY REFERENCE

The disclosure of Japanese Patent Application No. 2016-188867 filed on Sep. 27, 2016 including the specification, drawings and abstract is incorporated herein by reference in its entirety.

BACKGROUND

1. Technical Field

The present disclosure relates to a plug for a vehicle, the plug being inserted into a through-hole provided in a housing.

2. Description of Related Art

There has been well known a plug for a vehicle, including: a body portion having a circular-column outer shape and partially inserted into a through-hole provided in a housing; and a plurality of insertion portions formed integrally at intervals around an axial center of the body portion so as to extend from one end of the body portion in a direction parallel to the axial center, the plurality of insertion portions being inserted into the through-hole. An example thereof is a breather plug described in Japanese Patent Application Publication No. 2008-180313 (JP 2008-180313 A). JP 2008-180313 A discloses a breather device including a breather plug inserted into a through-hole provided in a transmission case, a breather hose connected to the breather plug, and a breather chamber communicating with atmosphere through the breather plug and the breather hose. Here, the plug for the vehicle includes a retaining lug provided in an insertion portion to be inserted into the through-hole so as to prevent the plug from falling out of the through-hole. Various structures are known as such a structure for retaining the plug for the vehicle. For example, there is a structure of a plug described in Japanese Patent Application Publication No. 8-218818 (JP 8-218818 A). JP 8-218818 A discloses a plug including a plurality of locking arms (corresponding to insertion portions) formed at intervals in a circumferential direction so as to be inserted into a through-hole, and retaining hook portions (corresponding to retaining lugs) provided in respective tip ends of the locking arms.

SUMMARY

In the meantime, like the breather device disclosed in JP 2008-180313 A, the hose may be connected to the plug. In such a case, the plug may rotate around its axial center due to application of an external force to the hose, or the like reason. In this regard, it is conceivable that a flange portion having a notch for prevention of rotation on its outer periphery is provided in a part of the plug, the part being not inserted into the through-hole, so that the rotation of the plug around the axial center is restricted by the notch and a projecting member provided in the housing at a position adjacent to the plug so as to project outside the housing. Meanwhile, depending on a configuration of the insertion portion provided with the retaining lug, the plug may easily fall out with respect to an external force applied to the plug. Particularly, in a case of the plug provided with the notch for prevention of rotation, when an external force is applied to the plug so as to incline the plug in an opposite direction to the notch, the plug is easily inclined, so that a hook margin of the retaining lug is reduced, which may cause the plug to easily fall out of the through-hole.

The present disclosure provides a plug for a vehicle, the plug being configured to hardly fall out of a through-hole even if the plug is inclined due to an external force, in a case where a flange portion having a notch for restricting rotation around an axial center is provided.

A plug for a vehicle according to an aspect of the present disclosure includes: a body portion having a circular-column shape and configured such that one part of the body portion is inserted into a through-hole provided in a housing; a plurality of insertion portions formed integrally at intervals around an axial center of the body portion so as to extend from one end of the body portion in a direction parallel to the axial center, the plurality of insertion portions being configured to be inserted into the through-hole; and a flange portion formed integrally with the other part of the body portion, the other part being not inserted into the through-hole, the flange portion having a notch formed on an outer periphery so as to restrict a rotation of the body portion around the axial center by being engaged with a projecting member provided in the housing in a projecting manner toward outside the housing at a position adjacent to the body portion. The insertion portions are formed at two positions opposed to each other across a straight line passing through the notch and the axial center and are provided with retaining lugs engageable with the through-hole.

In the above aspect, the insertion portions are formed at the two positions opposed to each other across the straight line passing through the notch and the axial center and are provided with retaining lugs engageable with the through-hole. Accordingly, when the plug for the vehicle is inclined due to an external force in a direction opposite to the notch in which direction the plug for the vehicle is easily inclined, hook margins of the retaining lugs are hardly reduced. That is, by providing the retaining lugs at the positions where the hook margins of the retaining lugs are not reduced at the time when the plug for the vehicle is inclined due to the external force, it is possible to restrain the plug for the vehicle from falling out. Accordingly, in a case where the plug for the vehicle includes the flange portion provided with the notch that restricts the rotation around the axial center, even if the plug for the vehicle is inclined due to the external force, the plug for the vehicle can hardly fall out of the through-hole.

In the above aspect, the insertion portions may be further formed at two positions opposed to each other across the axial center, on the straight line passing through the notch and the axial center; and the insertion portions formed at the two positions opposed to each other across the axial center may not be provided with the retaining lugs.

Further, in the above configuration, the insertion portions are further formed at the two positions opposed to each other across the axial center, on the straight line passing through the notch and the axial center, which allows the plug for the vehicle to be easily inserted straight into the through-hole at the time when the plug for the vehicle is inserted into the through-hole. Further, since the insertion portions formed at the two positions opposed to each other across the axial center are not provided with the retaining lugs, the plug for the vehicle is easily inserted into the through-hole. That is, when the retaining lugs are provided only at the positions where the hook margins of the retaining lugs are not reduced at the time when the plug for the vehicle is inclined due to the external force, it is possible to achieve both restraint of falling-off of the plug for the vehicle and easiness of the insertion thereof.

In the above aspect, the flange portion may have a sector shape with an arc smaller than a semicircle, and the notch may be formed in the arc.

Further, in the above configuration, the flange portion is configured such that an arc where the notch is formed has a sector shape with an arc smaller than a semicircle, and therefore, it is useful to provide the retaining lugs at positions where the hook margins of the retaining lugs are not reduced at the time when the plug for the vehicle is inclined due to an external force in a direction opposite to the notch in which direction the plug is easily inclined.

In the above aspect, the plug may further include a hose joint portion formed integrally with the other part of the body portion and configured to communicate an external space outside the housing with a hole portion inside the body portion, the hole portion being configured to communicate with a breather chamber provided in an upper part inside the housing. The plug may be a breather plug.

Further, in the above configuration, the plug for the vehicle is a breather plug provided with the hose joint portion, and therefore, in a case where the breather plug includes the flange portion having the notch that restricts the rotation around the axial center, which might occur due to application of an external force to the hose, or the like reason, even if the breather plug is inclined due to the external force, the breather plug can hardly fall out of the through-hole.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will hereinafter be described in detail with reference to the drawings.

Figure 1:
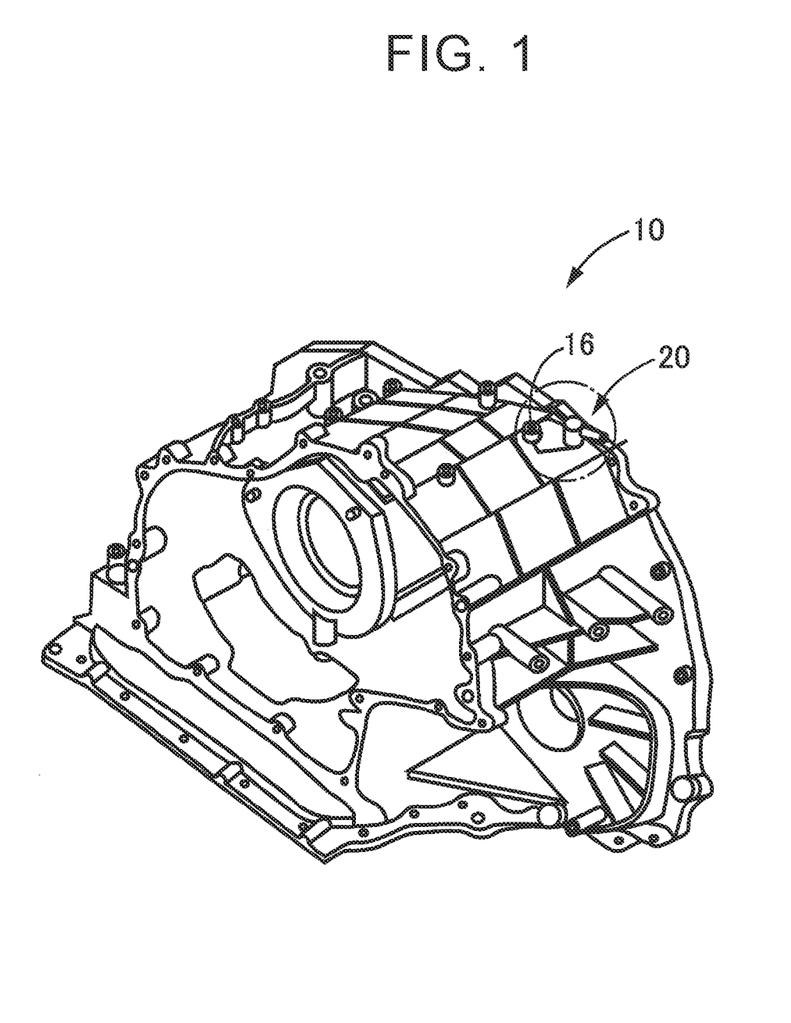
FIG. 1 is an outside drawing schematically illustrating a housing to which a plug for a vehicle is attached, and the present disclosure is applied to the plug.
Figure 2:
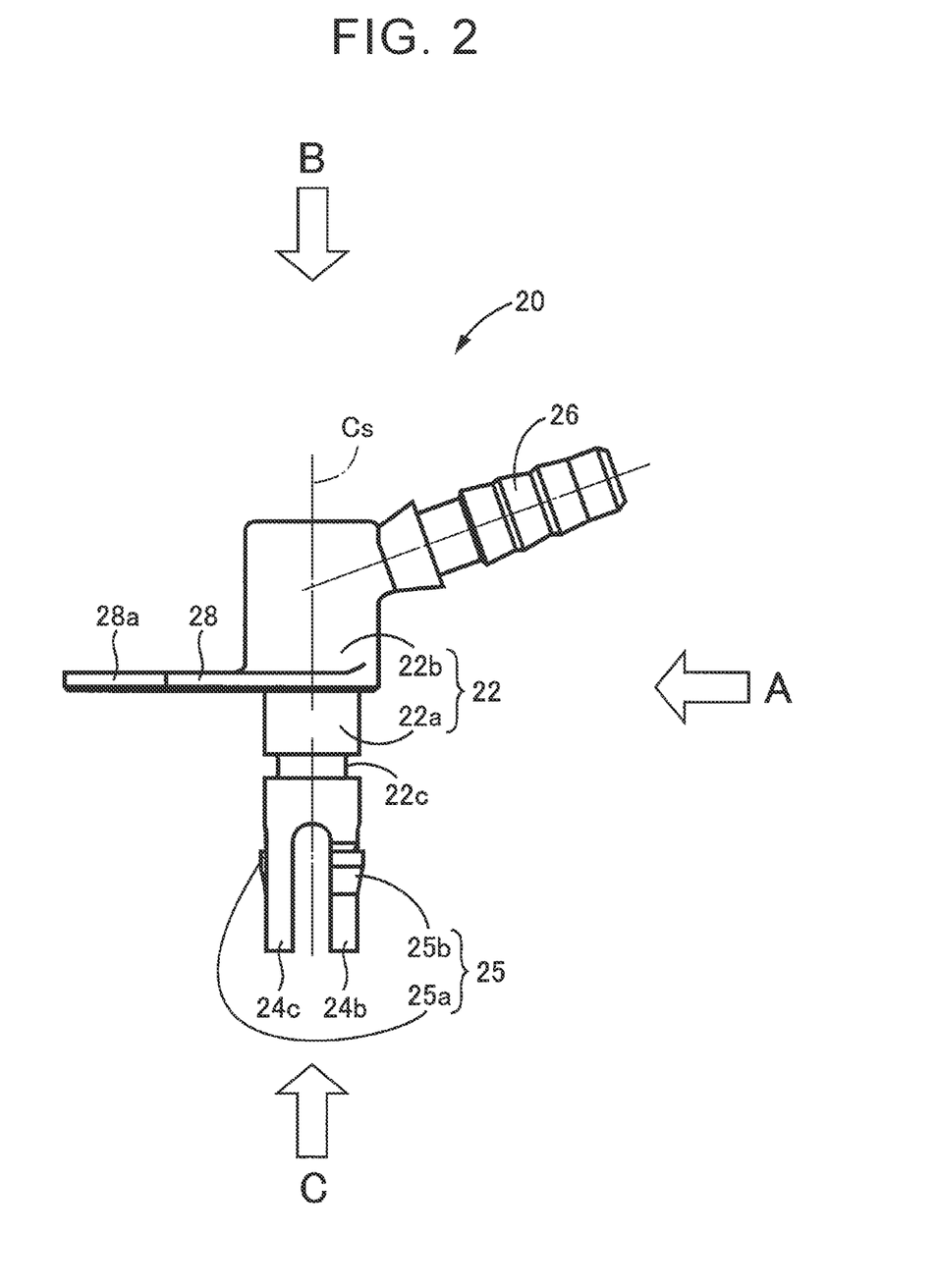
FIG. 2 is an outside drawing schematically illustrating the plug for the vehicle.
Figure 3:
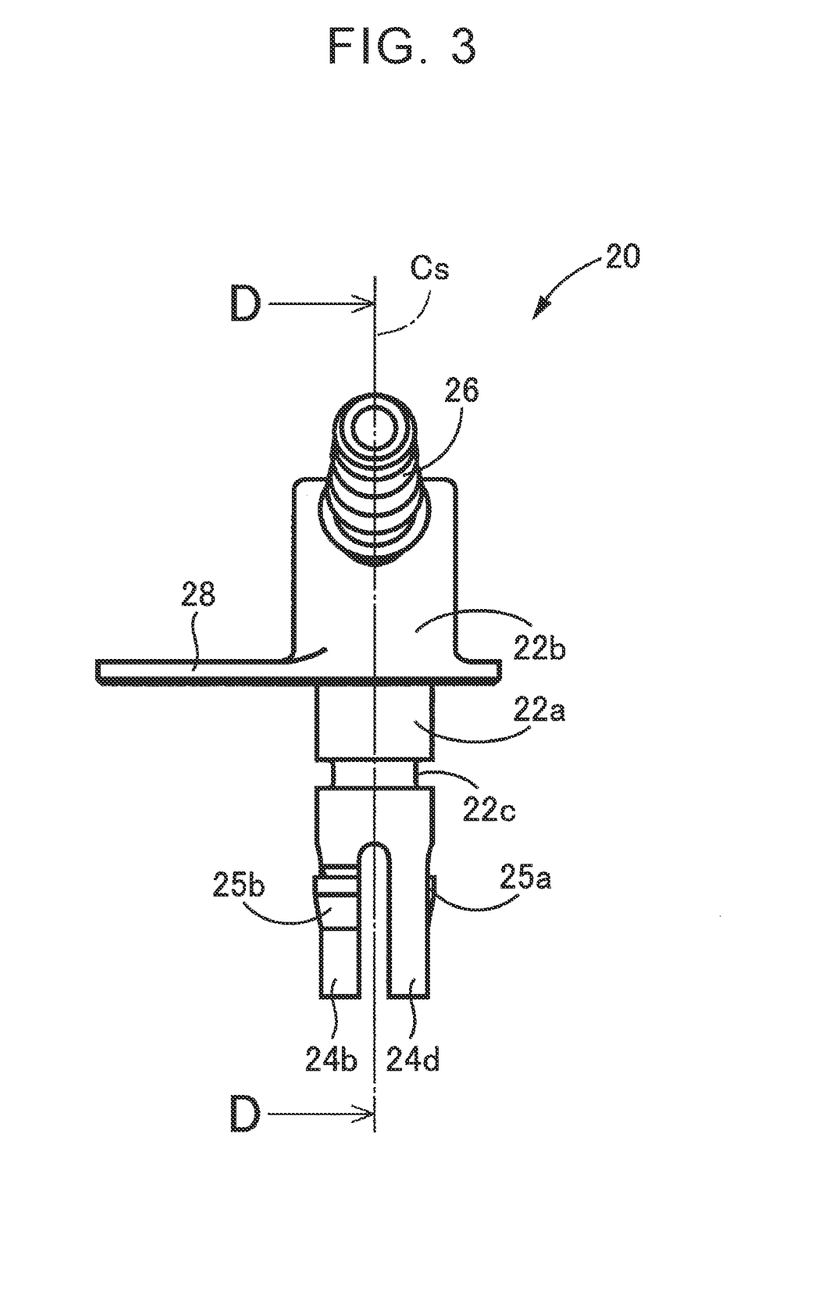
FIG. 3 is an outside drawing of the plug for the vehicle illustrated in FIG. 2, when viewed from A.
Figure 4:
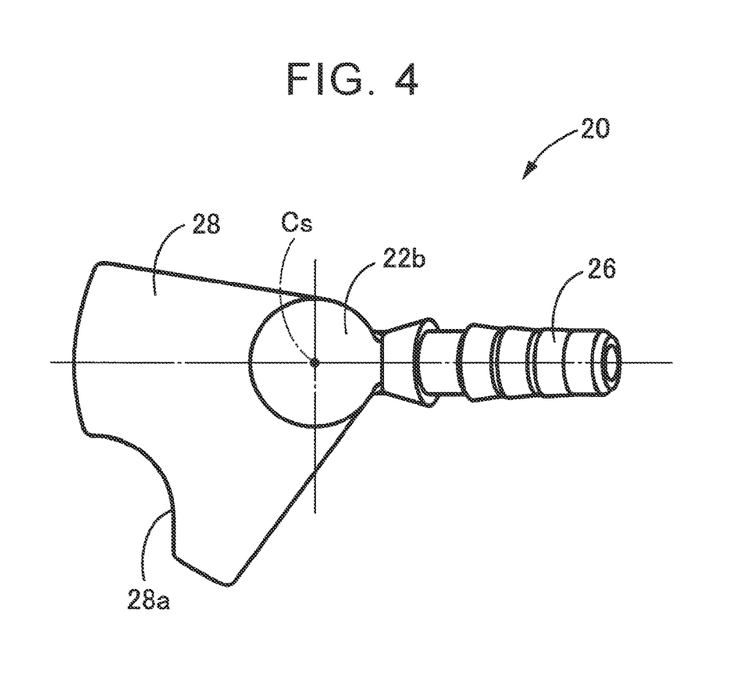
FIG. 4 is an outside drawing of the plug for the vehicle illustrated in FIG. 2, when viewed from B.
Figure 5:
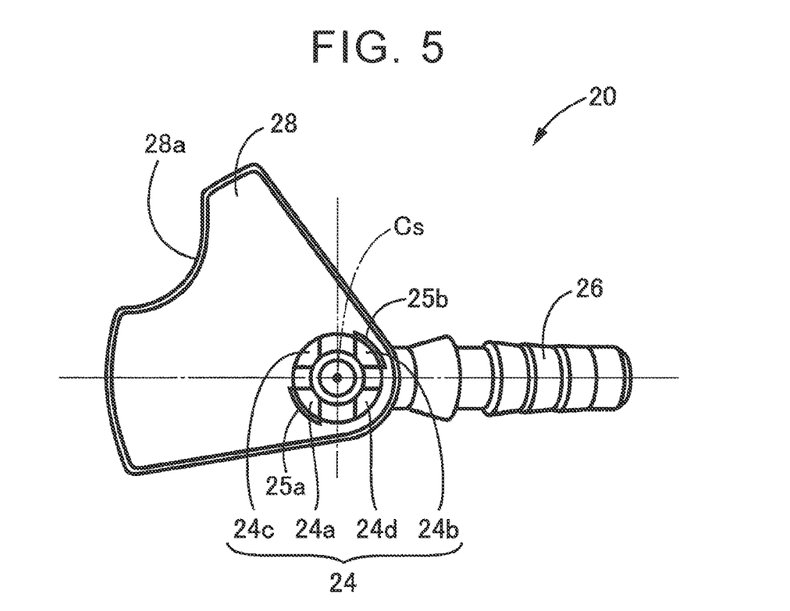
FIG. 5 is an outside drawing of the plug for the vehicle illustrated in FIG. 2, when viewed from C.
Figure 6:
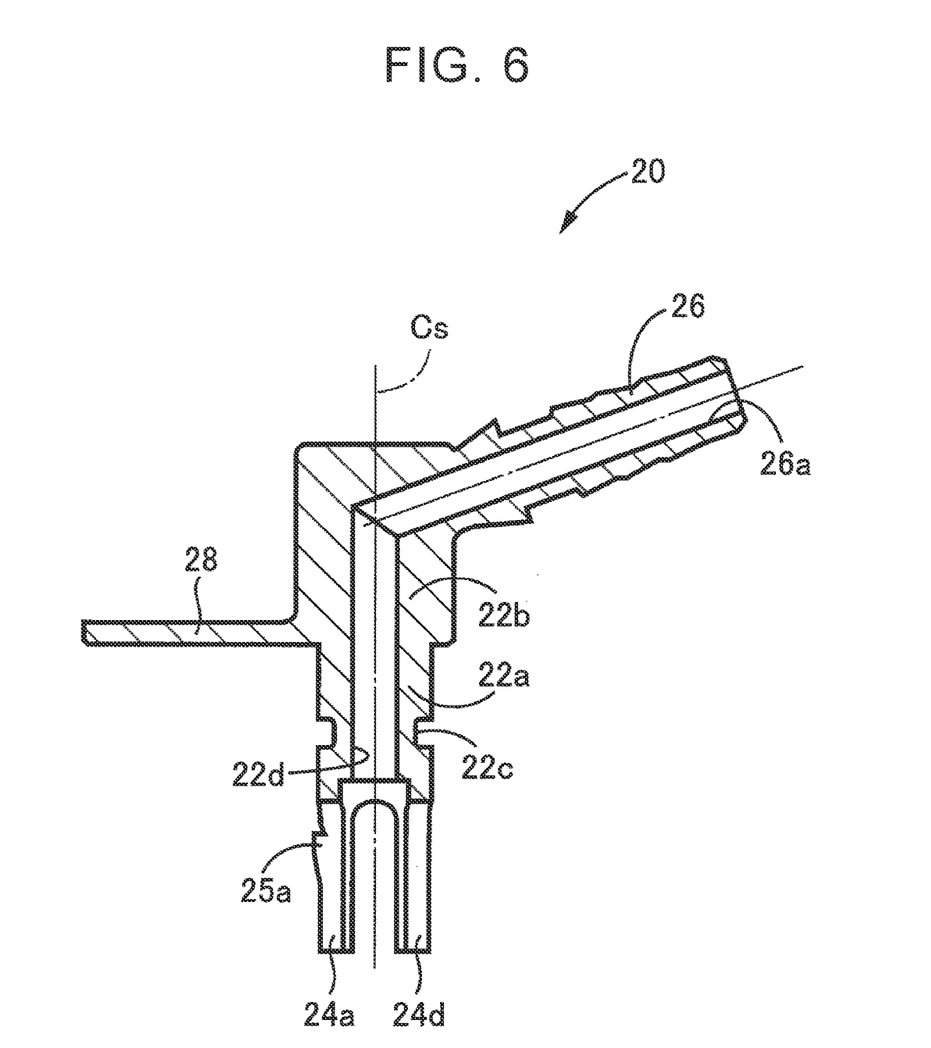
FIG. 6 is a sectional view taken along a line D-D in the outside drawing viewed from A in FIG. 3.
Figure 7:
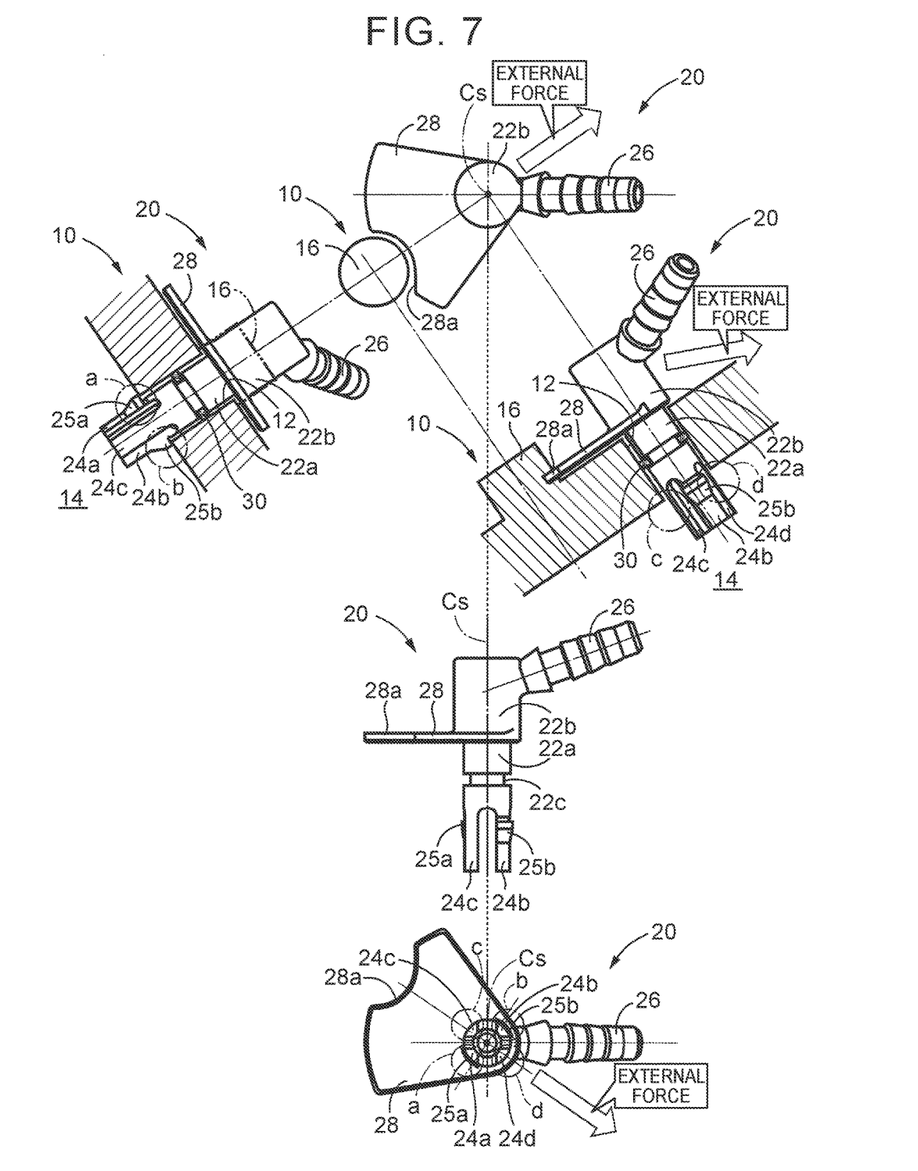
FIG. 7 illustrates a view illustrating a state where the plug for the vehicle is attached to the housing, together with the outside drawing of FIG. 2, the outside drawing viewed from B in FIG. 4, and the outside drawing viewed from C in FIG. 5.

FIG. 1 is an outside drawing schematically illustrating a housing 10 to which a plug 20 for a vehicle (hereinafter just referred to as the plug 20) is attached (see a circled part indicated by an alternate long and short dash line in FIG. 1). The present disclosure is applied to the plug 20. FIG. 2 is an outside drawing schematically illustrating the plug 20. FIG. 3 is an outside drawing of the plug 20 illustrated in FIG. 2, when viewed from A. FIG. 4 is an outside drawing of the plug 20 illustrated in FIG. 2, when viewed from B. FIG. 5 is an outside drawing of the plug 20 illustrated in FIG. 2, when viewed from C. FIG. 6 is a sectional view taken along a line D-D in the outside drawing viewed from A in FIG. 3. FIG. 7 is a view illustrating a state where the plug 20 is attached to the housing 10, together with the outside drawing of FIG. 2, the outside drawing viewed from B in FIG. 4, and the outside drawing viewed from C in FIG. 5.

In FIGS. 1 to 7, the housing 10 is a case (more specifically, a transmission case) in which a power transmission device is accommodated, the power transmission device being provided in a power transmission path between a driving force source such as an engine (and/or a rotating machine) and driving wheels. The plug 20 is a well-known breather plug attached to a through-hole 12 (see FIG. 7) provided on a top surface of the housing 10, for example, so as to prevent oil leakage by adjusting a pressure in the housing 10. Further, the plug 20 is a plug made of resin, for example.

The housing 10 includes a breather chamber 14 (see FIG. 7) provided in an upper part (a vehicle upper side) inside the housing 10. The breather chamber 14 communicates with an external space outside the housing 10 through the plug 20. Oil (e.g., oil mist) gathered by a rotational member of the power transmission device placed inside the housing 10 flows into the breather chamber 14, for example. In order that the oil mist and the air do not gush out into the external space outside the housing 10, for example, the breather chamber 14 has a structure (that is, a labyrinth structure) in which a passage is provided in a form of labyrinth by ribs (not shown) as a plurality of partition walls in an upper space inside the housing 10 near the plug 20. That is, in the breather chamber 14, it is necessary for the oil entering (flowing) through a breather chamber inlet to pass through the labyrinth-shaped passage so as to reach the through-hole 12 (the same meaning as the plug 20 herein), and before the oil reaches the through-hole 12, the oil is accumulated in some spaces in the passage due to a viscosity or a surface tension of the oil itself. This appropriately prevents so-called breather blow, which discharges the oil inside the housing 10 to outside the housing 10.

The plug 20 includes: a body portion 22 having a circular-column outer shape and configured such that one part 22a thereof to be inserted into the through-hole 12 and the other part 22b that is not inserted into the through-hole 12 are formed integrally (that is, the one part 22a is inserted into the through-hole 12); and a plurality of insertion portions 24 formed integrally with the one part 22a at predetermined intervals around an axial center Cs of the body portion 22 so as to extend in a direction parallel to the axial center Cs from one end (an end of the one part 22a on an opposite side to the other part 22b) of the body portion 22, the plurality of insertion portions 24 being inserted into the through-hole 12. The other part 22b of the body portion 22 is configured such that a radius of its section perpendicular to the axial center Cs is larger than the through-hole 12 having a circular section perpendicular to the axial center Cs. The plug 20 includes, as the insertion portions 24, four insertion portions, i.e., an insertion portion 24a, an insertion portion 24b, an insertion portion 24c, and an insertion portion 24d. This allows the plug 20 to be easily inserted straight into the through-hole 12 at the time when the plug 20 is inserted into the through-hole 12. A groove 22c to which an annular sealing member 30 (see FIG. 7) is fitted is formed on an outer periphery of the one part 22a of the body portion 22. A hole portion 22d (see FIG. 6) communicating with the breather chamber 14 is formed inside the body portion 22. Accordingly, the body portion 22 has a generally cylindrical shape. Note that the axial center Cs corresponds to an axis (a rotating axis) when the body portion 22 is assumed a circular column.

The plug 20 further includes a hollowed hose joint portion 26 formed integrally with the other part 22b of the body portion 22. Inside the hose joint portion 26, a joint hole portion 26a is formed so as to communicate with the hole portion 22d in the body portion 22 on one end side thereof and communicate with the external space outside the housing 10 on the other end side thereof. Accordingly, the hose joint portion 26 communicates the hole portion 22d inside the body portion 22 with the external space outside the housing 10. A breather hose (not shown), for example, is attached to the hose joint portion 26. The breather hose is placed in the external space around the housing 10, and the other end thereof opposite to one end thereof attached to the hose joint portion 26 is opened to the external space outside the housing 10. The breather hose is extended upward from the hose joint portion 26, and further, the other end thereof is opened downward, so that water, a foreign matter, or the like does not enter the housing 10 from the other end, for example.

The plug 20 further includes a flange portion 28 formed integrally with the other part 22b of the body portion 22. The flange portion 28 includes a notch 28a on its outer periphery so as to restrict a rotation of the body portion 22 around the axial center Cs by being engaged with a projecting member 16 (see FIG. 7) provided in the housing 10 in a projecting manner toward outside the housing 10 at a position adjacent to the body portion 22 (the other part 22b). The flange portion 28 has a sector shape with an arc smaller than a semicircle (that is, a sector shape with a minor arc, which is a circular arc smaller than the semicircle). The flange portion 28 has the notch 28a formed in the above sector arc shape. To provide the flange portion 28 with such a notch 28a is useful for the plug 20 to which the breather hose is connected and which may rotate around the axial center Cs due to application of an external force to the breather hose, or the like reason.

Here, the plug 20 includes a retaining lug 25 provided in the insertion portion 24 to be inserted into the through-hole 12 so as to prevent the plug 20 from falling out of the through-hole 12. That is, the insertion portion 24 is provided with the retaining lug 25 that is engageable with the through-hole 12. The retaining lug 25 will be described below in detail.

In the plug 20 provided with the notch 28a for prevention of rotation, when an external force (see a blank arrow in FIG. 7) is applied to the plug 20 so as to incline the plug 20 in an opposite direction to the notch 28a, the notch 28a is hardly caught on the projecting member 16, and therefore, the plug 20 is easily inclined. On that account, in a case where the plug 20 is provided with the notch 28a for prevention of rotation, the plug 20 most easily falls out of the through-hole 12 in terms of the external force applied in a direction indicated by the blank arrow in FIG. 7.

In this regard, the insertion portions 24 provided with the retaining lugs 25 are formed at two positions opposed to each other across a straight line passing through the notch 28a (e.g., a center of the notch 28a or near the center of the notch 28a) and the axial center Cs.

More specifically, the insertion portions 24a, 24b are formed at two positions opposed to each other across the straight line passing through the notch 28a and the axial center Cs, and are provided with retaining lugs 25a, 25b.

In a case where the plug 20 is provided with the notch 28a for prevention of rotation, when the retaining lugs 25 are provided at positions (see parts a, b circled by an alternate long and short dash line in FIG. 7) where the insertion portions 24a, 24b are formed in terms of the external force applied in the direction indicated by the blank arrow of FIG. 7, the retaining lugs 25 are always caught on the through-hole 12, thereby making it difficult for the plug 20 from falling out. In a case where the plug 20 is provided with only two retaining lugs 25, it is useful to provide the retaining lugs 25 at the positions of the parts a, b circled by the alternate long and short dash line in FIG. 7. Further, in a case where the plug 20 is provided with only two retaining lugs 25, the plug 20 is easily inserted into the through-hole 12 in comparison with a case where all the insertion portions 24 are provided with respective retaining lugs 25.

Meanwhile, the insertion portions 24c, 24d are formed at two positions opposed to each other across the axial center Cs on the straight line passing through the notch 28a and the axial center Cs, and no retaining lug 25 is provided in the insertion portions 24c, 24d. In a case where two retaining lugs 25 are provided only at positions (that is, positions of parts c, d circled by an alternate long and short dash line in FIG. 7) where the insertion portions 24c, 24d are formed, if an external force is applied in the direction indicated by the blank arrow in FIG. 7, the retaining lug 25 provided in the insertion portion 24d moves in a direction apart from the through-hole 12 due to the principle of leverage, so that the plug 20 easily falls out.

As described above, in the present embodiment, the insertion portions 24 (the insertion portions 24a, 24b) are formed at two positions opposed to each other across the straight line passing through the notch 28a and the axial center Cs, and are provided with the retaining lugs 25 (the retaining lugs 25a, 25b) engageable with the through-hole 12. Accordingly, when the plug 20 is inclined due to the external force in the direction opposite to the notch 28a, in which direction the plug 20 is easily inclined, hook margins of the retaining lugs 25a, 25b are hardly reduced. That is, by providing the retaining lugs 25 at the positions where the hook margins of the retaining lugs 25 are not reduced at the time when the plug 20 is inclined due to an external force, it is possible to restrain the plug 20 from falling out. Therefore, in a case where the plug 20 includes the flange portion 28 having the notch 28a that restricts the rotation around the axial center Cs, even if the plug 20 is inclined due to an external force, the plug 20 can hardly fall out of the through-hole 12.

Further, in the present embodiment, the insertion portions 24c, 24d are formed at two positions opposed to each other across the axial center Cs on the straight line passing through the notch 28a and the axial center Cs, which allows the plug 20 to be easily inserted straight into the through-hole 12 at the time when the plug 20 is inserted into the through-hole 12. Further, since the insertion portions 24c, 24d formed at two positions opposed to each other across the axial center Cs are not provided with the retaining lugs 25, the plug 20 is easily inserted into the through-hole 12. That is, when the retaining lugs 25 are provided only at the positions where the hook margins of the retaining lugs 25 are not reduced at the time when the plug 20 is inclined due to an external force, it is possible to achieve both restraint of falling-off of the plug 20 and easiness of the insertion.

Further, in the present embodiment, the flange portion 28 is configured such that an arc where the notch 28a is formed has a sector shape with an arc smaller than a semicircle, and therefore, and therefore, it is useful to provide the retaining lugs 25 at positions where the hook margins of the retaining lugs 25 are not reduced at the time when the plug 20 is inclined due to an external force in the direction opposite to the notch 28a in which direction the plug 20 is easily inclined.

Further, in the present embodiment, the plug 20 is a breather plug provided with the hose joint portion 26. Accordingly, in a case where the breather plug includes the flange portion 28 having the notch 28a that restricts the rotation around the axial center Cs which might occur due to application of an external force to the breather hose, or the like reason, even if the breather plug is inclined due to the external force, the breather plug can hardly fall out of the through-hole 12.

The embodiment of the present disclosure has been described in detail with reference to the attached drawings, but the present disclosure is applied to the other aspects.

For example, in the above embodiment, the plug 20 includes, as the insertion portions 24, four insertion portions, i.e., the insertion portion 24a, the insertion portion 24b, the insertion portion 24c, and the insertion portion 24d. However, the present disclosure is not limited to this aspect. For example, the plug 20 may include, as the insertion portions 24, at least the insertion portions 24a, 24b formed at two positions opposed to each other across the straight line passing through the notch 28a and the axial center Cs and provided with the retaining lugs 25a, 25b. That is, in the plug 20, the insertion portions 24 provided with the retaining lugs 25 may be formed at least at two positions opposed to each other across the straight line passing through the notch 28a and the axial center Cs.

Further, in the above embodiment, the power transmission device accommodated in the housing 10 is, for example: a transmission for a vehicle, constituted by a planetary-gear automatic transmission, a synchromesh parallel two-shaft transmission, a DCT (Dual Clutch Transmission), a continuously variable transmission, or the like; a differential gear connected to the transmission for the vehicle; and the like.

Further, the above embodiment exemplifies, as the housing 10, a transmission case in which a power transmission device is accommodated, and further exemplifies, as the plug 20, a breather plug provided with the hose joint portion 26, so as to describe the present disclosure. The present disclosure is not limited to the embodiment like the housing 10 and the plug 20, but is applicable to the other embodiments. For example, the present disclosure can be also applied to a breather plug that does not include the hose joint portion 26. Further, the present disclosure can be applied to a housing configured to accommodate members and the like constituting a vehicle, a housing divided into a main body and a cover and configured to accommodate some mechanisms and the like of an engine, and a plug for a vehicle to be inserted into a through-hole of such a housing, as a stopper that just buries the through-hole. Further, the present disclosure can be also applied to a plug for a vehicle to be inserted into a through-hole of a housing, merely as a hose joint.

These are merely one embodiment to the utmost, and the present disclosure can be performed in an embodiment to which various changes and improvements are added based on the knowledge of a person skilled in the art.

What is claimed is:

1. A plug for a vehicle, comprising:
a body portion having a circular-column shape and configured such that one part of the body portion is inserted into a through-hole provided in a housing;
a plurality of insertion portions formed integrally at intervals around an axial center of the body portion so as to extend from one end of the body portion in a direction parallel to the axial center, the plurality of insertion portions being configured to be inserted into the through-hole; and
a flange portion formed integrally with the other part of the body portion, the other part being not inserted into the through-hole, the flange portion having a notch formed on an outer periphery so as to restrict a rotation of the body portion around the axial center by being engaged with a projecting member provided in the housing in a projecting manner toward outside the housing at a position adjacent to the body portion, wherein
the insertion portions include two insertion portions that are respectively formed at two positions opposed to each other across a straight line passing through the notch and the axial center and that are each provided with retaining lugs engageable with the through-hole, and
the insertion portions further include two additional insertion portions that are respectively formed at two positions opposed to each other across the axial center, on the straight line passing through the notch and the axial center, and the two additional insertion portions are not provided with the retaining lugs.

2. The plug according to claim 1, further comprising:
a hose joint portion formed integrally with the other part of the body portion and configured to communicate an external space outside the housing with a hole portion inside the body portion, the hole portion being configured to communicate with a breather chamber provided in an upper part inside the housing, wherein
the plug is a breather plug.

3. A plug for a vehicle, comprising:
a body portion having a circular-column shape and configured such that one part of the body portion is inserted into a through-hole provided in a housing;
a plurality of insertion portions formed integrally at intervals around an axial center of the body portion so as to extend from one end of the body portion in a direction parallel to the axial center, the plurality of insertion portions being configured to be inserted into the through-hole; and
a flange portion formed integrally with the other part of the body portion, the other part being not inserted into the through-hole, the flange portion having a notch formed on an outer periphery so as to restrict a rotation of the body portion around the axial center by being engaged with a projecting member provided in the housing in a projecting manner toward outside the housing at a position adjacent to the body portion, wherein
the insertion portions include two insertion portions that are respectively formed at two positions opposed to each other across a straight line passing through the notch and the axial center and that are each provided with retaining lugs engageable with the through-hole, and wherein:
the flange portion has a sector shape with an arc smaller than a semicircle; and
the notch is formed in the arc.

4. The plug according to claim 3, wherein
the notch has an arc shape.

* * * * *